March 8, 1966   R. J. HUNT   3,239,065
STRAINER
Original Filed Feb. 11, 1959
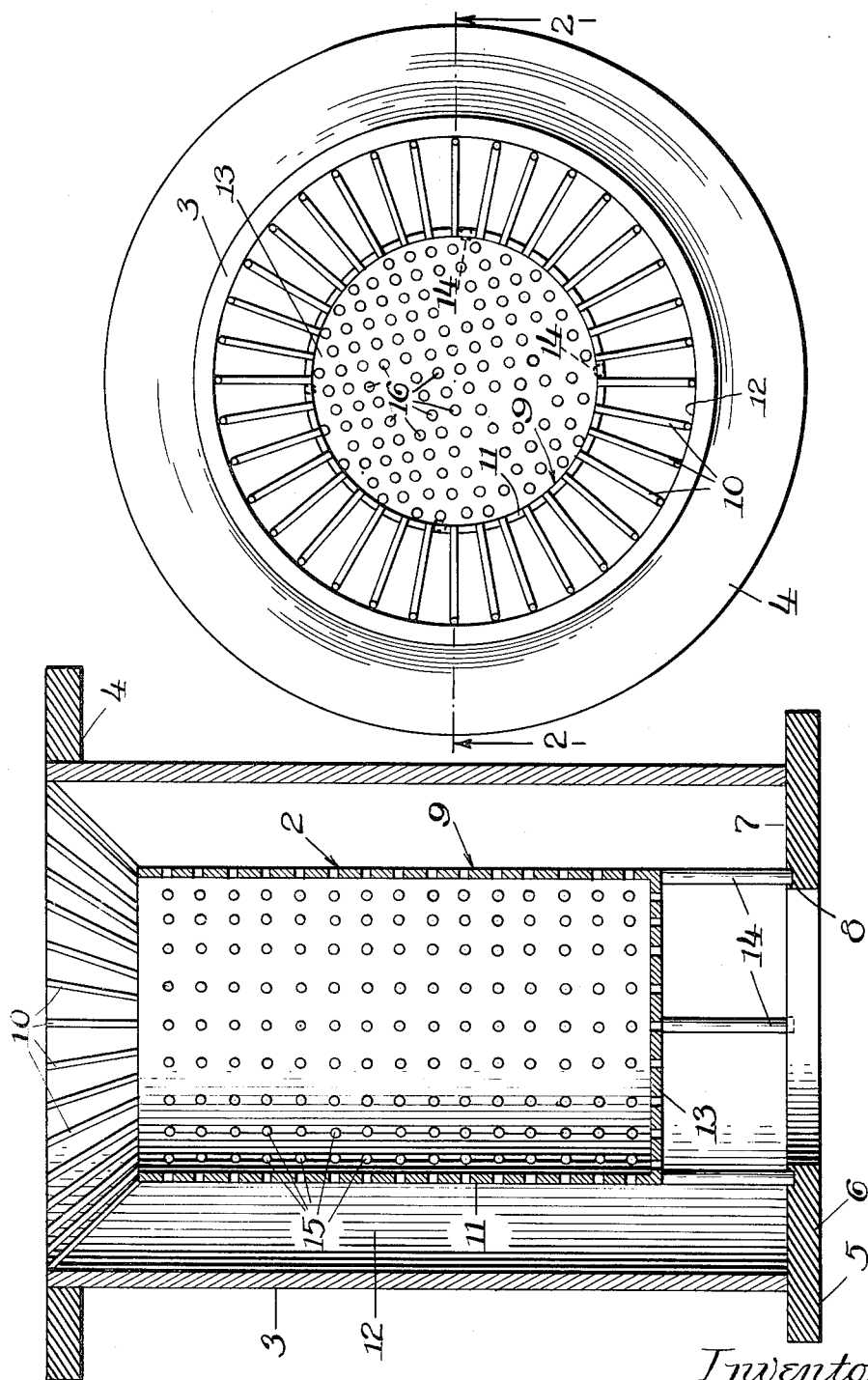
Inventor,
Raymond J. Huntowski,
By: Schneider, Dressler, Goldsmith & Clement, Attys.

3,239,065
STRAINER
Raymond J. Hunt, Glenview, Ill., assignor to FMC
Corporation, a corporation of Delaware
Original application Feb. 11, 1959, Ser. No. 792,493, now
Patent No. 3,074,558, dated Jan. 22, 1963. Divided
and this application Dec. 10, 1962, Ser. No. 245,347
5 Claims. (Cl. 210—448)

This application is a division of my copending application Serial No. 792,493 filed February 11, 1959, which issued as Patent No. 3,074,558 on January 22, 1963.

This invention relates to a strainer adapted for use in connection with the sewage inflow to a wet well, and is particularly concerned with means for preventing such strainers from being clogged.

Although the strainer may be used in many different fields, it is specifically designed for sewage inflow into a wet well from which the sewage liquid is pumped when the liquid level attains a predetermined height, and will be described in connection with said use.

In sewage systems provided with a wet well for the accumulation of liquid it is customary to use one or more conduit sections for both the inflow and the discharge conduit. The pump is idle during the inflow cycle and the liquid sewage carries various solids through the conduit. When the mixture of liquid and solids reach the strainer, the solids are intercepted by the strainer, and the liquid flows through the strainer to the wet well.

Liquid sewage often contains rags and various paper products, such as, for example, toilet paper, diapers, napkins, hand towels and paper used in sanitary napkins. These solids have a tendency to become draped over the strainer and to clog it so as to impair or stop the flow of liquid through the strainer. This problem has become more acute in recent years with the advent of high wet strength papers which do not disintegrate readily even when wet.

In accordance with the present invention, the strainer, which is so positioned in the conduit that all the liquids flowing through the conduit must pass through the strainer before they can flow into the wet well, is designed to retain the solids in the strainer in spaced relationship to the inner wall surface of the conduit. The strainer comprises an inner receptacle adapted to hold solids, and means supporting the receptacle in spaced relationship to the inner wall surface of the conduit. The receptacle has foraminated side and bottom walls. The liquid flowing through the conduit by-passes the intercepted solids by flowing through the space provided between the outer wall of the receptable and the inner wall surface of the conduit. The liquid flowing through said space passes through the strainer so that its solids can be intercepted before it enters said space.

The conduit is provided with an internal annular shoulder, and legs, upon which the strainer is mounted, extend upwardly from said shoulder. The liquid passing through the strainer flows through the opening defined by the shoulder into the wet well, or into another conduit section that leads to the wet well. The solids which are retained in the strainer are allowed to accumulate as long as the inflow cycle continues. The strainer is designed to hold all the solids that accumulate during the inflow cycle without allowing them to extend outwardly beyond the confines of the inner receptacle which is spaced from the inner wall surface of the conduit. The bottom of the inner receptacle is spaced above the shoulder to provide a passageway for the liquid to flow below the bottom of the inner receptacle and through the opening defined by the internal shoulder in the conduit.

When the liquid level in the wet well reaches a predetermined level, the pump starts operating and reverses the flow of liquid through the conduit sections which serve for discharge as well as inflow of sewage. A check valve closes the portion of the conduit used exclusively for inflow, and the discharge is directed toward the outlet. As the liquid is pumped through the strainer, it carries all the solids accumulated therein to the outlet along with the liquid discharge. The pump is set to start operating at a level low enough so that the strainer never gets completely filled with the intercepted solids. If the intercepted solids come too close to filling the strainer before the pump starts, the condition may be corrected by replacing the strainer with a strainer of larger capacity, or by adjusting the level of pump operation so that the pump starts to operate at a lower liquid level.

The structure by means of which the above-mentioned and other advantages of the invention are attained will be described in the following specification, taken in conjunction with the accompanying drawings showing a preferred illustrative embodiment of the invention, in which:

FIGURE 1 is a top plan view of one embodiment of the invention; and

FIG. 2 is a cross sectional view, taken along the line 2—2 of FIG. 1.

Referring to the drawings, strainer 2 is mounted within a conduit section 3 in spaced relationship to the inner wall surface of the conduit section. The conduit section forms part of a conduit in a sewage system and is adapted to be inserted in the system in such position that it is used for both inflow and discharge of the sewage, the direction of flow being reversed for each cycle.

Conduit section 3 has an outwardly extending annular flange 4 at its upper edge and a second flange 5, similar to flange 4, at its lower edge. Flanges 4 and 5 facilitate securement of the conduit section to adjacent conduit sections. A flange 6 which may be integral with flange 5, extends inwardly of the lower edge of conduit section 3 to provide an annular internal shoulder 7 which defines an opening 8 and also serves to support strainer 2.

Strainer 2 comprises a cylindrical receptacle 9 positioned within the conduit section and a plurality of rods 10 extending from the upper edge of the receptacle to the inner wall surface of the conduit section so that all liquids flowing through the conduit section must pass through the strainer. The spacing between rods 10 is uniform, and limits the size of solids that can pass therebetween. Receptacle 9 comprises a cylindrical side wall 11, spaced uniformly from the inner wall surface of conduit section 3 to provide an annular space 12, and a bottom wall 13. Bottom wall 13 is spaced above opening 8 by a plurality of vertical legs 14 which support the receptacle and also prevent it from shifting laterally in the conduit section. Legs 14 may be secured in any suitable manner, but preferably have their lower ends embedded in flange 6.

Rods 10 are preferably welded to the upper edge of cylindrical wall 11 and are spaced to intercept solids carried by the liquid sewage flowing into the upper end of conduit section 3. Receptacle 9 has an open top which is spaced below the upper edge of conduit section 3. Rods 10 slope downwardly and inwardly from the upper edge of the conduit section to the upper edge of the inner receptacle and direct the solids intercepted by the rods into the open top of the inner receptacle. The rods cooperate with the receptacle to prevent any liquids from flowing through the conduit section without passing through strainer 2. Receptacle 9 comprises a cylindrical side wall 11 spaced uniformly from the inner wall surface of conduit section 3 to provide an annular space 12, and a bottom wall 13. The annular space is of uniform depth throughout the length of receptacle 9 which it surrounds.

A plurality of vertical rods 14 extending upwardly from flange 6 engage bottom wall 13 to support receptacle 9 with wall 13 spaced above opening 21. Rods 14 preferably have one end embedded in flange 6, but may be secured in any suitable manner. Rods 14 also prevent receptacle 9 from shifting laterally within the conduit section.

The angle at which the rods 10 slope causes solids intercepted by said rods to be carried into receptacle 9. The solids carried by liquid sewage that flows directly into receptacle 9 are intercepted by the walls of the receptacle. The walls of the receptacle are perforated to permit only the liquid to pass therethrough.

Liquids that flow between rods 10 pass directly into space 12 and then under bottom wall 13 of receptacle 9 to reach opening 8 which leads to a wet well or to another conduit section that leads to a wet well. Liquids that flow into the open top of receptacle 9 flow through apertures 15 in side wall 11 and apertures 16 in bottom wall 13 to reach space 12 or opening 8. When solids intercepted by rods 10 or receptacle 9 completely cover the surface of bottom wall 13, apertures 16 are blocked, but the liquid can still flow through apertures 15 spaced above the intercepted solids, and into space 12.

During the inflow cycle, liquid sewage, carrying various solids with it, enters the upper end of conduit section 3. The outwardly and upwardly extending rods 10 intercept some of the solids and direct them inwardly into receptacle 9. These solids, along with the solids that pass directly into the receptacle flow into the receptacle along with the liquid flowing into the receptacle. The liquid within the conduit, but outside the confines of the receptacle, flows between the rods 10 into the space 12 between the outer surface of the inner receptacle and the inner wall surface of conduit section 3. The solids, intercepted by rods 10 and the receptacle build up until they completely cover the bottom of the receptacle. As soon as bottom 13 is completely covered by the solids, the passage of liquids through the bottom is blocked, and liquids flowing into the upper open end of receptacle 9 pass outwardly through the apertures 15 into the space 12. The liquids bypass the intercepted solids by flowing through space 12, and then flow through the spaces between rods 14 below the bottom of the inner receptacle, in which the solids are retained, to reach opening 8.

The inflow cycle is regulated so as to terminate before the solids reach a level above the plane at the base of rods 10. As soon as the inflow cycle stops, a pump starts operating to reverse the flow through conduit section 3 before the receptacle becomes completely filled with intercepted solids.

Perforations 15 are large enough to permit the liquid pumped through opening 8 into the conduit section to flow into receptacle 9 to flush the intercepted solids out of the receptacle and through the discharge outlet, thereby cleaning the conduit section for the next inflow cycle. The solids intercepted from liquid sewage during the inflow cycle are retained in the inner receptacle in spaced relationship to the inner wall surface of the conduit section, and to the opening in the bottom flange, so that the liquids flowing through the conduit can by-pass the intercepted solids and flow through the opening at the bottom of the conduit section.

Although I have described a preferred embodiment of the invention in considerable detail, it will be understood that the description is intended to be illustrative, rather than restrictive, as many details may be modified or changed, without departing from the spirit or scope of the invention. Accordingly, I do not desire to be restricted to the exact construction described.

I claim:

1. In combination with a conduit having an opening at one end through which liquid is adapted to flow, and an annular internal shoulder surrounding said opening, a strainer secured in said conduit, said strainer being so located that all liquids flowing through said conduit must pass through said strainer to reach said opening, said strainer being adapted to intercept solids carried by liquids flowing through said conduit and to retain them in spaced relationship to said opening and to the inner wall surface of said conduit, said strainer comprising a receptacle open at its end most remote from said first mentioned opening in said conduit and a plurality of strainer members extending upwardly and outwardly from the open end of said receptable into engagement with the inner wall surface of said conduit, said strainer members being spaced closely enough to intercept solids carried by liquids flowing therebetween and being inclined at an angle sufficient to direct the solids intercepted thereby downwardly into the interior of said receptacle, said receptacle having foraminated side walls spaced from the inner wall surface of said conduit and a foraminated end wall spaced from said opening and spaced support members extending from said end wall to said shoulder to support said strainer in fixed position relative to said conduit and said opening.

2. In combination with a conduit having an opening at one end through which liquid is adapted to flow, and an annular internal shoulder surrounding said opening, a strainer secured in said conduit, said strainer being so located that all liquids flowing through said conduit must pass through said strainer to reach said opening, said strainer being adapted to intercept solids carried by liquids flowing through said conduit and to retain them in spaced relationship to said opening and to the inner wall surface of said conduit, said strainer comprising a foraminated cylindrical receptacle open at one end, rods extending outwardly and upwardly from said open end to the inner wall surface of said conduit, said rods being spaced closely enough to intercept solids carried by liquids flowing therebetween and inclined sufficiently to direct solids intercepted thereby into the interior of said receptacle, and a plurality of spaced rods extending from the opposite end of said receptacle to said shoulder to support said receptacle in fixed position with its cylindrical wall spaced from the inner wall surface of said conduit and its end oppsite the open end spaced from said shoulder in parallel relationship thereto.

3. In combination with a conduit having an opening at one end through which liquid is adapted to flow and an annular internal shoulder surrounding said opening, a strainer secured in fixed position in said conduit, said strainer being so located that all liquids flowing through said conduit must pass through said strainer to reach said opening, said strainer being adapted to intercept solids carried by liquids flowing through said conduit, said strainer comprising an inner receptacle open at its end most remote from said first mentioned opening in said conduit and having a foraminated cylindrical wall spaced from and concentric with the inner wall surface of said conduit and a foraminated end wall, means spacing said end wall from first mentioned group, said foraminated walls intercepting solids carried by liquids flowing through said conduit and permitting the flow of liquids therethrough, said receptacle confining said intercepted solids in a region spaced from said opening and from the inner wall surface of said conduit, and means extending between said open end and the inner wall surface of said conduit to intercept solids from liquids flowing into the space between said cylindrical wall and the inner wall surface of said conduit, said means leaving a permanently open entrance for the flow of liquids into the space between said cylindrical wall and the inner wall surface of said conduit, and means spacing said foraminated end wall from said opening, whereby liquids flowing into the space between said cylindrical wall and the inner wall surface of said conduit when said end wall and said cylindrical wall are completely covered by intercepted solids may flow through the space between said cylindrical wall and the inner wall surface of said conduit and under said end wall to enter said opening.

4. In combination with a conduit having an opening at one end through which liquid is adapted to flow, and an annular internal shoulder surrounding said opening, a strainer secured in fixed position in said conduit, said strainer being so located that all liquids flowing through said conduit must pass through said strainer to reach said opening, said strainer being adapted to intercept solids carried by liquids flowing through said conduit, said strainer comprising a foraminated cylindrical receptacle open at its end most remote from said first mentioned opening in said conduit and spaced from the inner wall surface of said conduit, rods projecting upwardly from said shoulder to support said receptacle above said opening, and rods extending upwardly and outwardly from the open end of said receptacle to the inner wall surface of said conduit to prevent liquids from entering the space between said receptacle and the inner wall surface of said conduit without passing through said strainer.

5. A strainer for use in a conduit having an opening at one end through which liquid is adapted to flow, said strainer being adapted to be held in said conduit in such position that all liquids flowing through said conduit must pass through said strainer to reach said opening, said strainer being adapted to intercept solids carried by liquids flowing through said conduit, said strainer comprising an inner receptacle having a foraminated cylindrical wall spaced from and concentric with the inner wall surface of said conduit and a foraminated end wall, said receptacle being open at its end opposite said foraminated end wall, said foraminated walls intercepting solids carried by liquids flowing through said conduit and permitting the flow of liquids therethrough, said receptacle confining said intercepted solids in a region spaced from said opening and from the inner wall surface of said conduit, and means extending between said open end and the inner wall surface of said conduit to intercept solids from liquids flowing into the space between said cylindrical wall and the inner wall surface of said conduit, said means leaving a permanently open entrance for the flow of liquids into the space between said cylindrical wall and the inner wall surface of said conduit, and means spacing said foraminated end wall from said opening, whereby liquids flowing into the space between said cylindrical wall and the inner wall surface of said conduit when said end wall and said cylindrical wall are completely covered by intercepted solids may flow through the space between said cylindrical wall and the inner wall surface of said conduit and under said end wall to enter said opening.

References Cited by the Examiner

UNITED STATES PATENTS

| | | | |
|---|---|---|---|
| 1,240,747 | 9/1917 | McKeone | 210—448 X |
| 1,289,512 | 12/1918 | Minard | 210—497 X |
| 1,731,085 | 10/1929 | Warren | 210—448 X |
| 2,197,787 | 4/1940 | Chadwick | 210—451 X |
| 2,278,178 | 3/1942 | Lannert | 210—448 |
| 2,695,411 | 11/1950 | Vinokor | 210—497 X |
| 2,722,316 | 11/1955 | Goscilo | 210—448 X |

REUBEN FRIEDMAN, *Primary Examiner.*

HARRY B. THORNTON, *Examiner.*